United States Patent [19]

Yoshida et al.

[11] 3,888,403

[45] June 10, 1975

[54] TAPE DRIVE SYSTEM

[75] Inventors: Kenji Yoshida, Tokyo; Tetsuo Sekiya, Yokohama; Toyokazu Higo, Tokyo, all of Japan

[73] Assignee: Sony Corporation, Tokyo, Japan

[22] Filed: Nov. 20, 1973

[21] Appl. No.: 417,504

[30] Foreign Application Priority Data

Nov. 24, 1972 Japan .............................. 47-117843

[52] U.S. Cl. ................. 226/188; 226/108; 310/114

[51] Int. Cl. .............................................. B65h 17/22

[58] Field of Search ....... 226/49, 51, 108, 111, 181, 226/188, 194, 38; 242/190; 310/112, 114

[56] References Cited

UNITED STATES PATENTS 3,191,834 6/1965 Nakauchi .............................. 226/38

3,717,780 2/1973 Hohne ................................ 310/114

*Primary Examiner*—M. Henson Wood, Jr.
*Assistant Examiner*—Gene A. Church
*Attorney, Agent, or Firm*—Hill, Gross, Simpson, Van Santen, Steadman, Chiara & Simpson

[57] ABSTRACT

A magnetic recording and/or reproducing apparatus having a capstan assembly comprising a pair of capstans mounted on a support plate for driving a magnetic tape in cooperation with pinch rollers. The rotor shafts act as the capstan shafts directly, and a bearing member for holding the rotor shafts and the support plate are cast in mono-block, whereby extremely accurate mounting of the motors on the support chassis panel is possible.

7 Claims, 5 Drawing Figures

TAPE DRIVE SYSTEM

FIELD OF THE INVENTION

This invention relates to a magnetic recording and/or reproducing apparatus, and particularly to such apparatus in which a magnetic tape is driven by a pair of capstans such as, for example, in structures such as shown in United States letters Pat. Nos. 3,191,834 and 3,409,239.

DESCRIPTION OF THE PRIOR ART

In conventional magnetic recording and/or reproducing apparatus of the direct drive, dual capstan, tape type, a pair of capstans are driven directly by means of two motors respectively and the tape is engaged between a pair of capstans and pinch rollers to be transported in a predetermined direction. In such systems, however, each of the motors is mounted on the chassis plate independently, and, typically, the two motors are disposed very close to each other making it very difficult to mount the motors on the chassis plate.

Further, in general, the capstans must be almost exactly parallel to each other and each of the capstans must be precisely perpendicular to the chassis plate. If not so, the running of the tape will be disturbed, causing an increase, for example, in the wow and/or flutter in the system.

In such conventional apparatus, with the drive motors mounted on the chassis plate independently, it is difficult to mount the motors precisely parallel to each other and perpendicular to the chassis plate.

SUMMARY OF THE INVENTION

An object of the invention is to provide an improved and extremely simple magnetic recording and/or reproducing apparatus that overcomes the disadvantages noted above.

In particular, it is an object of the invention to provide a new apparatus in which the tape is transported by a pair of capstans acting directly as the drive motor shafts.

A further object of the invention is to provide such an apparatus in which the drive means is mounted easily with extremely high accuracy.

The foregoing and other objects are attained in the present invention through the provision of apparatus of driving the tape by a pair of capstans mounted on a single support plate. The capstan shafts comprise the rotor shaft, and the support plate and bearing members for holding the rotor shafts are cast in mono-block.

A better understanding of the invention may be had by reference to the following description, taken in conjunction with the accompanying drawing, in which.

DETAILED DESCRIPTION OF THE DRAWINGS

Figure 1:
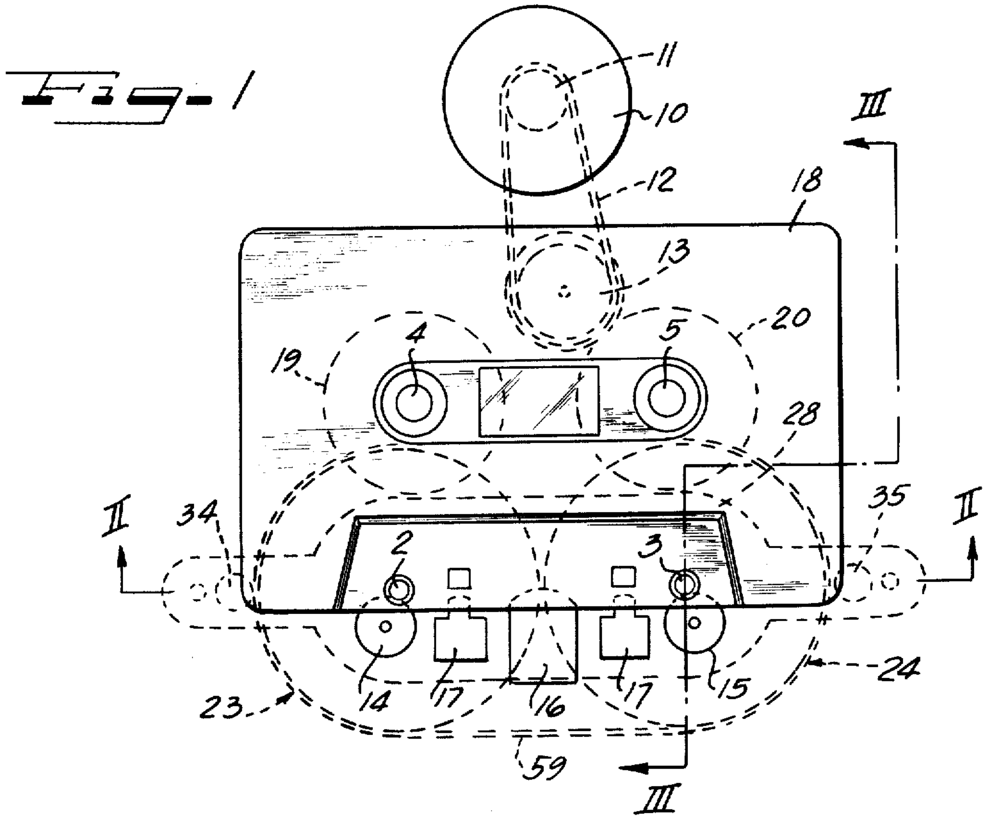
FIG. 1 is a plan view of a cassette tape recorder according to this invention.
Figure 2:
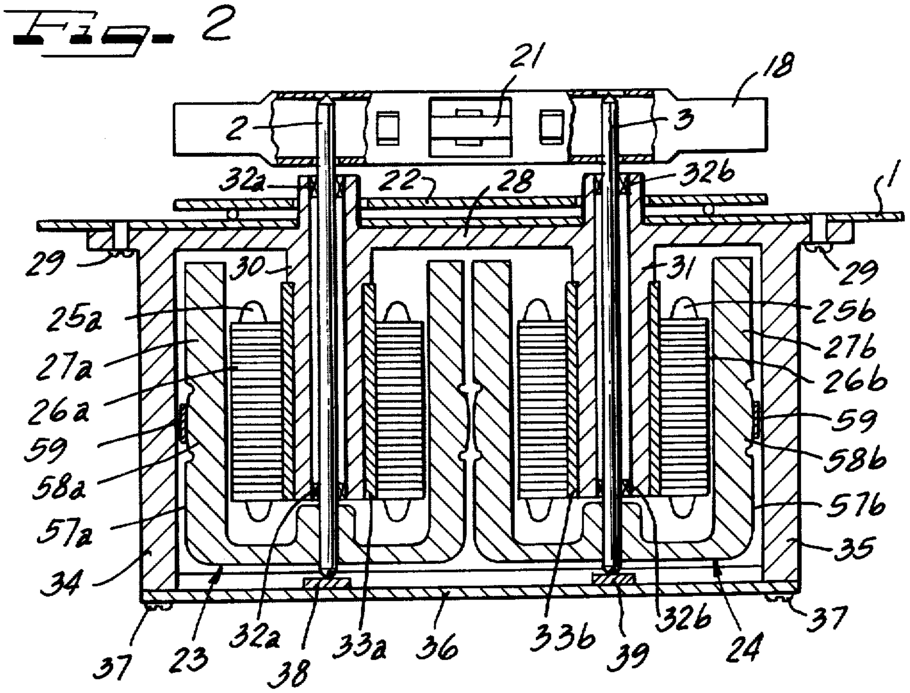
FIG. 2 is a sectional elevation view taken along the line II—II of FIG. 1.
Figure 3:
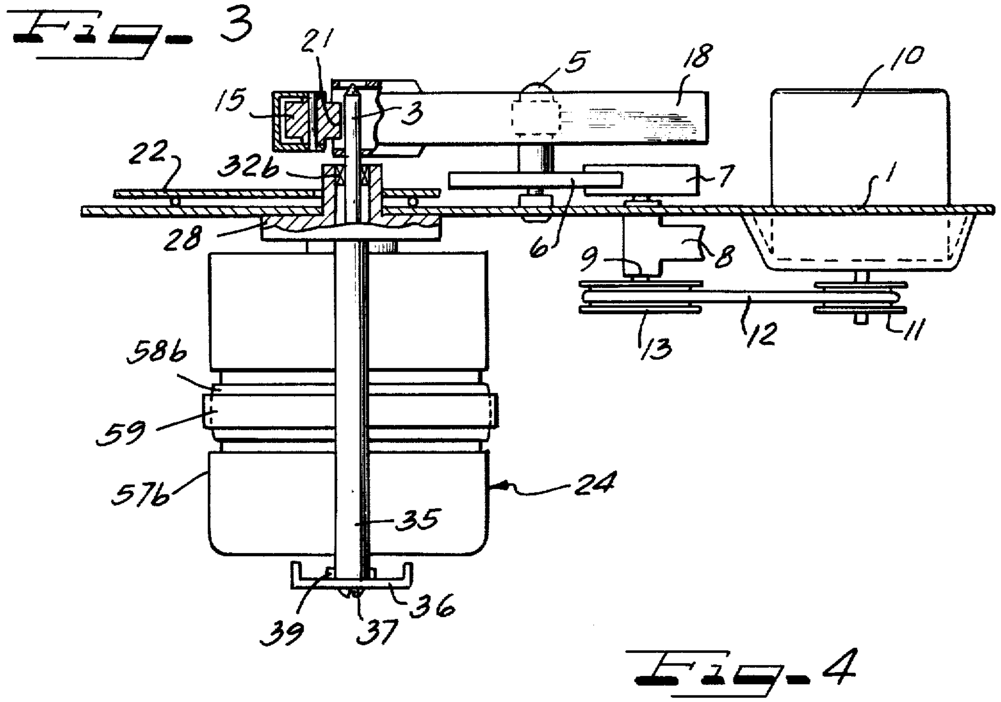
FIG. 3 is a sectional elevation view taken along the line III—III of FIG. 1.
Figure 4:
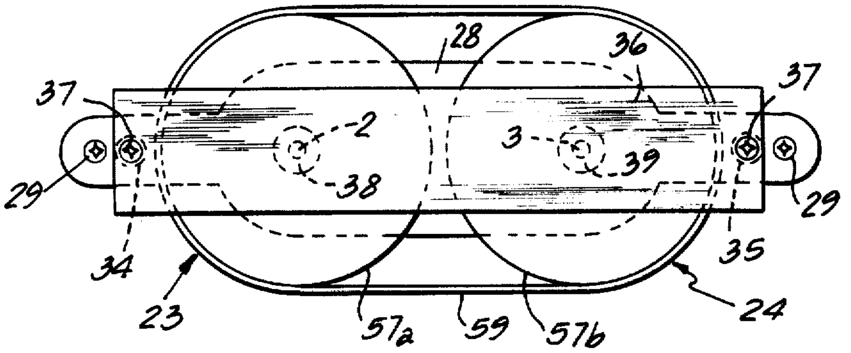
FIG. 4 is a bottom view of the apparatus shown in FIG. 1.

As can be seen from a consideration of the Figures, a tape deck main chassis plate 1 provides support for the drive motors and related gear. As shown, a tape cassette 18 is positioned with its reels 19,20 mounted on and driven by reel shafts 4 and 5 and with the tape passing between capstan shafts 2, 3 and their respective pinch rollers 14,15. Drive for the reel shaft 5 is conventionally provided by a reel pulley 6 carried by the shaft 5 and driven by an idler reel 7 rotated by motor 10 via pulleys 11, 13 and belt 12. The spindle 9 carrying idler 7 and pulley 13 is mounted in a swingable arm 8 permitting contact of the idler 7 with reel shafts 4 or 5 selectively. The record-playback head 16 and the erasing heads 17 are conventional in operation and organization. The heads 16 and 17, as well as the pinch rollers 14 and 15 are mounted on a head base plate 22. Movement of the base 22 downward as viewed in FIG. 1 causes the heads 16 and 17 to come into contact with the tape 21 with the pinch rollers 14 and 15 in engagement with the capstan shafts 2 and 3 to drive the tape 21.

The capstans 2 and 3 comprise, integrally, the rotor shafts of motors of an outer-rotor type generally indicated at 23,24. In this arrangement, an integrally cast mono-block 28 is secured by rivets 29 to chassis 1. The mono-block member 28 carries integral therewith bearing supports 30,31 carrying bearings 32a and 32b respectively, such that the shafts 2 and 3 are carried precisely parallel to each other and precisely perpendicular to the chassis plate 1 in a manner that can be accomplished perfectly only by providing an integral mono-block casting. Support arms 34,35 are, in the embodiment shown in FIGS. 1 through 4, also integral with the mono-block member 28 whereby precise adjustment is provided for the bearing support plate 36 with thrust pads 38,39 which are secured to the arms 34,35 by securing bolts 37.

In the arrangement shown in FIGS. 1 through 4, the shafts 2 and 3 are driven by one of the rotors *27a,27b* which are rigidly secured to the respective shafts 2,3 are driven by one of the rotors *27a,27b* which are rigidly secured to the respective shafts 2,3. Laminated iron stators *26a,26b* are fixedly carried on bushings *33a,33b* fixed on sleeves 30,31. Electrical energy may be supplied to the stator windings *25a,25b* in any conventional manner through the mono-block member 28.

The outer rotor members *27a,27b* are directly linked to each other by way of a belt 59 trained around curved pulley portions *58a,58b* formed integrally in the peripheries *57a* and *57b* of the respective rollers *27a* and *27b*. Preferably, the belt 59 is formed of an elastic material such as natural or synthetic rubber.

Figure 5:
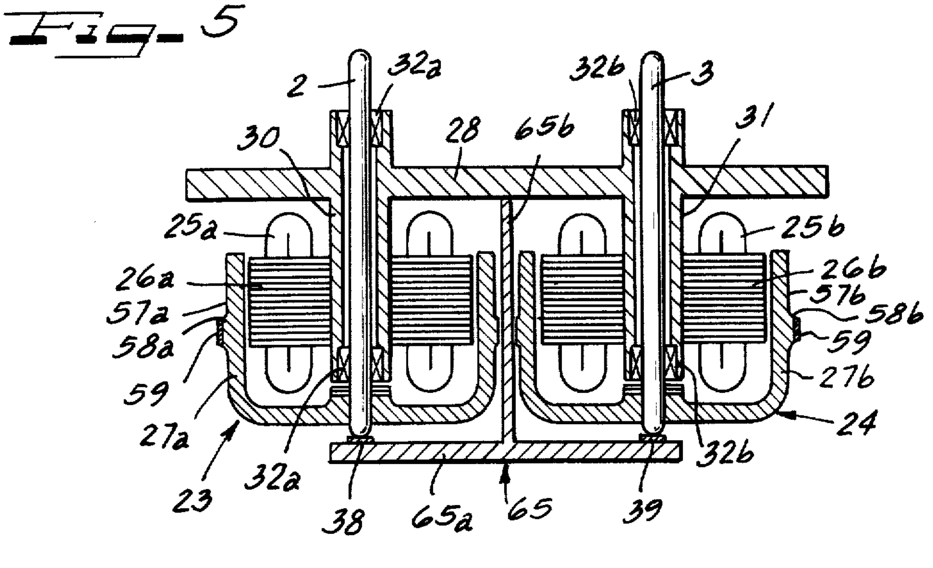
FIG. 5 is a sectional elevation view showing another embodiment according to this invention.

In the embodiment of the invention shown in FIG. 5, like numbers represent like elements of the structure, as may readily be seen. The significant difference between the structures of FIGS. 1–4 and 5 is the provision of the thrust bushings 38,39 upon a support element 65, in FIG. 5 which is supported by a central web *65b* secured to the center of the mono-block member 28 rather than at opposite ends by supports such as 34,35. The T-support 65 has extended arms *65a* which, by the nature of the T-support 65 provides equal, balanced, thrust against shafts 2 and 3. It will be recognized, of course, that the bushing supports 38,39 may be adjustable in either of the embodiments above described by providing adjustable set screws through the support 36 or 65 and into contact with the ends of the shafts 2, 3.

The structure set forth above provides a novel and substantially improved system for insuring complete accuracy in alignment of the components essential to high quality tape recording or reproducing. By providing the mono-block construction in which the capstans are actually the same elements as the motor rotor shafts, and providing an integral mono-block structure for supporting the shafts parallel to each other in fixed relation and perferably perpendicular to the mounting base, perfect alignment is possible, and is, in fact, guaranteed. In normal use, only one of the stators is energized at a given time, but it will be understood that the manner of energization of the respective stators 25*a*,25*b* is independent of the structure of the present invention. It will, of course, be understood that variations may be made in accordance with the principles of the present invention without departing from the novel concepts thereof, and, it is accordingly my intent that the invention be limited solely by that of the appended claims:

I claim as my invention:

1. A magnetic recording and/or reproducing apparatus comprising, a pair of capstans mounted on a mounting plate for transporting a tape in a predetermined direction in cooperation with a pinch roller, means for driving said pair of capstans, at least one of said driving means comprising a drive motor having an outer rotor secured to a rotor shaft of said motor, said rotor shaft acting directly as said capstan, axially spaced bearing means supporting said shafts and means for forming said mounting plate and all bearing members supporting said rotor shafts and their capstans for rotation in permanent rigidly fixed relation in integral mono-block.

2. Apparatus according to claim 1, including means for supporting a pair of thrust bearing means for said respective rotor shafts.

3. Apparatus according to claim 2, in which said last named means is held at the center portion of said mounting plate between said driving means.

4. An apparatus according to claim 2, in which said thrust bearing means includes an axially movable adjustment screw operable against the end of each of said capstan shafts.

5. An apparatus according to claim 1, in which said drive motor comprises a motor having an outer rotor secured to said rotor shaft and an inner stator integral with said mono-block and rigidly carrying said axially spaced bearing members within said outer rotor.

6. An apparatus according to claim 5 wherein identical rotors are carried by said capstan shafts in adjacent parallel relation and are co-driven by a belt trained thereabout.

7. A motor assembly comprising, a plurality of motors disposed adjacent and parallel to each other, each said motor comprising a stator portion and a rotor portion, and means for forming a supporting means for mounting said plurality of motors including axially spaced bearing means integral in mono-block with said stator portions for supporting the rotor shaft of the rotor portion of all of said motor means.

* * * * *